United States Patent [19]
Bolyard et al.

[11] Patent Number: 5,597,024
[45] Date of Patent: Jan. 28, 1997

[54] LOW PROFILE HARDWOOD FLOORING STRIP AND METHOD OF MANUFACTURE

[75] Inventors: Darl J. Bolyard, Whitmer, W. Va.; James E. Price; Dicky R. Welch, both of Jackson, Tenn.; Gerhard Henn, Königheim; Jürgen Petzold, Bad Rappenau, both of Germany

[73] Assignee: Triangle Pacific Corporation, Dallas, Tex.

[21] Appl. No.: 373,042

[22] Filed: Jan. 17, 1995

[51] Int. Cl.⁶ .................. B27L 5/02; B27C 9/00
[52] U.S. Cl. .......... 144/369; 52/796.1; 144/3.1; 144/39; 144/116; 144/371; 144/375; 428/47; 428/537.1
[58] Field of Search .................. 144/1 R, 3 R, 144/37, 39, 41, 90 R, 90 A, 114 R, 116, 332, 340, 350, 367, 369, 376, 370, 373, 374, 375; 83/102.1, 873; 156/304.1; 52/403.1, 480, 730.7, 796.1; 428/47, 48, 537.1

[56] References Cited

U.S. PATENT DOCUMENTS

| | | | |
|---|---|---|---|
| 338,973 | 3/1886 | Johnson, Jr. | 144/37 |
| 362,896 | 5/1887 | Mahaffey | 144/37 |
| 418,345 | 12/1889 | Woods et al. | 144/37 |
| 932,373 | 8/1909 | Burns et al. | 144/39 |
| 955,379 | 4/1910 | Burns et al. | 144/39 |
| 987,012 | 3/1911 | Perkins | 144/37 |
| 1,456,864 | 5/1923 | Blood et al. | 144/90 R |
| 1,584,796 | 5/1926 | Neal . | |
| 1,778,333 | 6/1928 | Neumann . | |
| 1,801,244 | 4/1931 | Blood | 144/90 R |
| 3,738,404 | 6/1973 | Walker | 144/312 |
| 3,934,630 | 1/1976 | Cockle | 144/39 |
| 4,879,857 | 11/1989 | Peterson et al. | 52/403 |
| 4,893,449 | 1/1990 | Kemper | 52/467 |
| 5,352,317 | 10/1994 | Traben et al. | 144/3 R |

FOREIGN PATENT DOCUMENTS

| | | | |
|---|---|---|---|
| 3700799A1 | 7/1988 | Germany | B27C 9/04 |
| WO89/01857 | 3/1989 | WIPO | B27M 3/00 |

*Primary Examiner*—W. Donald Bray
*Attorney, Agent, or Firm*—W. Thad Adams, III, P.A.

[57] ABSTRACT

A method of producing a hardwood flooring product, including the steps of processing a strip of raw wood into a blank having a predetermined thickness and width, and top and bottom surfaces defining parallel planes relative to each other, and splitting the blank along the width of the blank from one side to the other to form two low profile flooring strips having the same width as the blank and a thickness less than one-half the thickness of the blank. The splitting step includes the steps of providing first and second circular saw blades mounted on spaced-apart vertical axes for rotation in a single plane intermediate and parallel to the planes of the top and bottom surfaces of the blank and positioning the blank on conveying means upstream from the saw blades with the plane of rotation of the saw blades intermediate and parallel to the planes of the top and bottom surfaces of the blank for movement of the blank from an upstream position to a downstream position relative to the saw blades. The blank is moved downstream into the plane of rotation of the saw blades during rotation of the saw blades thereby horizontally splitting the blank to form first and second low-profile flooring strips. Interlocking members, such as molded, mating tongue and groove members, are molded into first and second longitudinally-extending side edges of the flooring strips for securing together the flooring strips when placed side-to-side to form a floor,

12 Claims, 6 Drawing Sheets

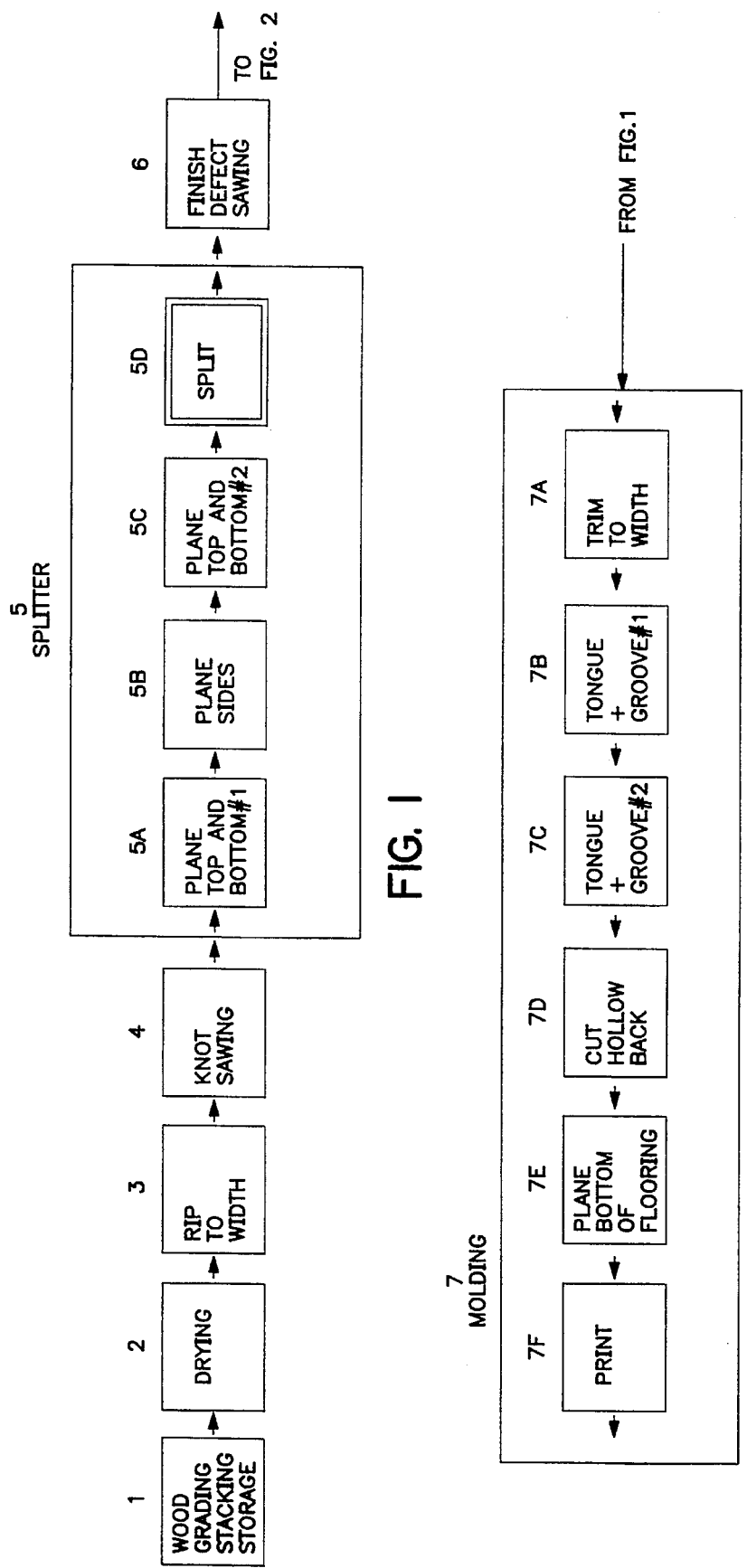

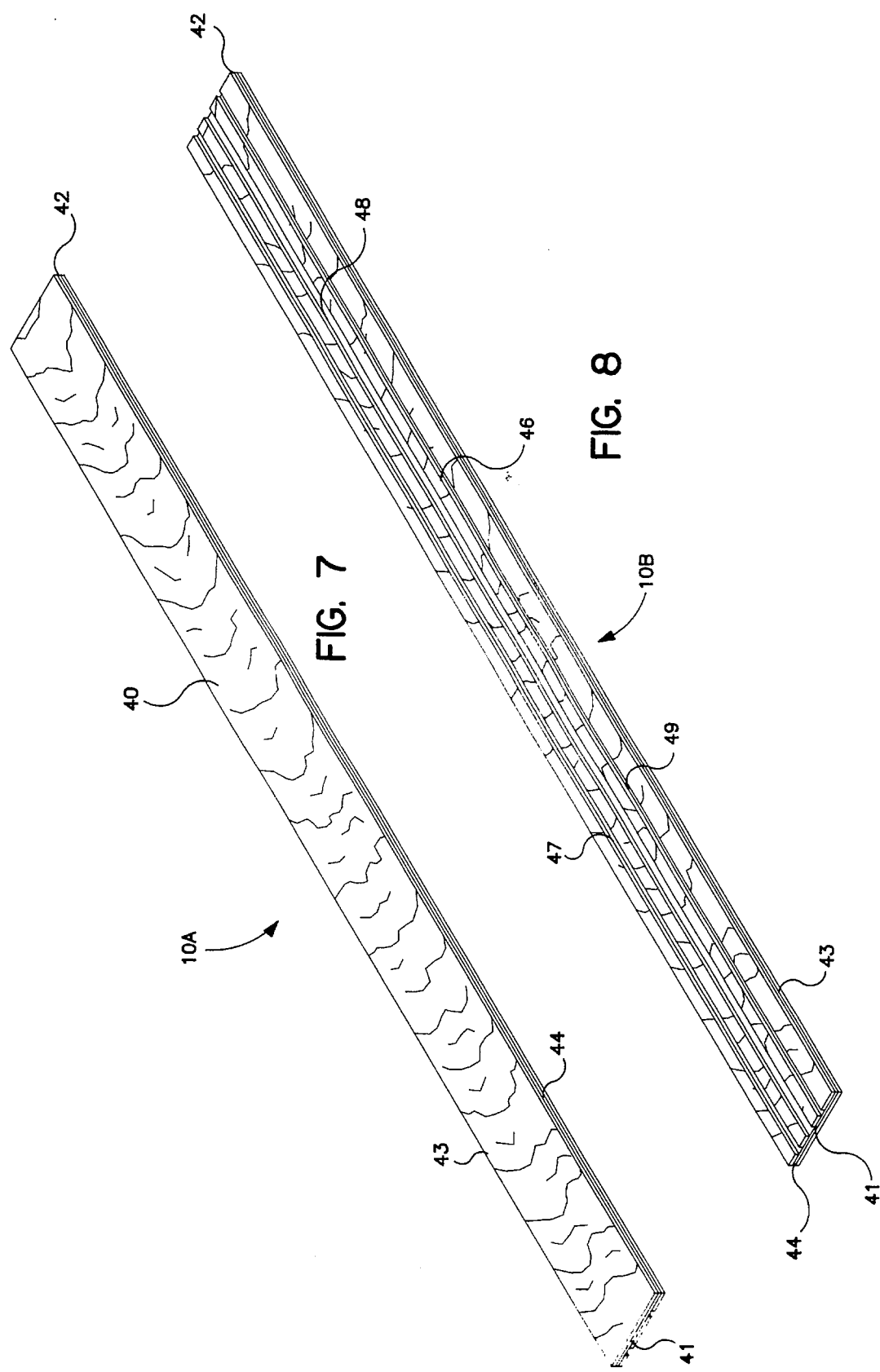

LOW PROFILE HARDWOOD FLOORING STRIP AND METHOD OF MANUFACTURE

TECHNICAL FIELD AND BACKGROUND OF THE INVENTION

This invention relates to a low profile hardwood flooring strip and its method of manufacture. The end product resulting from the processes described below is a hardwood flooring strip having a nominal thickness of 5/16" and a nominal width of either 2 1/4 or 3 1/4". The strips are intended to be sold as a prefinished "nail-down" product. After installation, the product is indistinguishable from a conventional 3/4" inch-thick hardwood flooring product of like width. However, the lower profile offers a number of substantial advantages. First, because almost twice the floor coverage can be achieved with the same amount of wood, very substantial savings in wood resources are possible.

When installed as a aftermarket product to replace an existing floor, the low profile permits installation over a floor where conventional carpet and padding was previously installed without the need to raise door bottoms or provide transitions between the new hardwood floor and adjacent flooring of other types. This results in very substantial labor savings.

Prior art methods of producing low profile wood flooring include simply planing down full-thickness boards with a substantial amount of resulting waste sawdust and very little actual saving in the wood used. The prior art also includes cutting over-thickness boards, typically with a thickness of approximately 1.25", widthwise with a bandsaw. A bandsaw-cut board has a very uneven cut surface which cannot be used even on the hidden surface of the board without substantial further planing. Both prior art processes are relatively slow, produce a relatively low quality product, and create bottlenecks in automated production lines which require high processing speeds. Prior art processes have not provided a means of precisely controlling the positioning of the blank from which the strip of flooring is produced, where the wood is sufficiently thin at the beginning of the process to provide significant savings in material and waste. The present method uses the same full thickness stock material used to produce conventional full thickness flooring, thus permitting the same production line to be used up to the splitting process itself.

In the present process counterrotating saw blades are used to "split" hardwood flooring material into very high quality low profile flooring strips at rates which are compatible with processing speeds of the other manufacturing processes, such as planing. This is accomplished by very precisely controlling the position of the wood blank before, during and after the splitting process. The result is a prefinished floor manufactured to extremely close tolerances, and with square edges which fit flush in the same manner as "sand-in-place" flooring.

SUMMARY OF THE INVENTION

Therefore, it is an object of the invention to provide a method of manufacturing a low profile hardwood flooring strip.

It is another object of the invention to provide a method of manufacturing a low profile hardwood flooring strip which saves a considerable quantity of wood in contrast to full thickness hardwood floors and prior art low profile methods.

It is another object of the invention to provide a method of manufacturing a low profile hardwood flooring strip which operates at a high speed production rate compatible with other steps in the manufacturing process.

It is another object of the invention to provide a method of manufacturing a low profile hardwood flooring strip which can be installed in place of an existing floor, such as a carpet, without raising door bottoms or transitioning to adjacent floorings.

It is another object of the invention to provide a method of manufacturing a low profile hardwood flooring strip which results in a floor which in indistinguishable from a full thickness floor after installation.

It is another object of the invention to provide a low profile hardwood flooring strip of precise and uniform dimension.

These and other objects of the present invention are achieved in the preferred embodiments disclosed below by providing a method of producing a hardwood flooring product, comprising the steps of processing a strip of raw wood into a blank having a predetermined thickness and width, and top and bottom surfaces defining parallel planes relative to each other and splitting the blank along width from one side to the other to form two low profile flooring strips having the same width as the blank and a thickness less than one-half the thickness of the blank. The splitting step comprises the steps of providing first and second circular saw blades mounted on spaced-apart vertical axes for rotation in a single plane intermediate and parallel to the planes of the top and bottom surfaces of the blank and positioning the blank on conveying means upstream from the saw blades with the plane of rotation of the saw blades intermediate and parallel to the planes of the top and bottom surfaces of the blank for movement of the blank from an upstream position to a downstream position relative to the saw blades. The blank is moved downstream into the plane of rotation of the saw blades during rotation of the saw blades thereby horizontally splitting the blank to form first and second low-profile flooring strips. Interlocking members, such as mating tongue and groove members, are molded into first and second longitudinally-extending side edges of the flooring strips for securing together flooring strips placed side-to-side to form a floor.

An embodiment of the method according to the invention includes the step of counterrotating the saw blades in a direction wherein both first and second saw blades cut into the wood in the upstream direction against the downstream direction of travel of the blank.

According to another preferred embodiment of the invention, the step of providing first and second saw blades includes the step of positioning the first saw blade upstream from the second saw blade whereby the first saw blade begins its cut before the second saw blade begins its cut.

According to yet another preferred embodiment of the invention, the first saw blade is positioned upstream from the second saw blade and therefore begins its cut before the second saw blade begins its cut, and wherein both the first and second saw blades are positioned relative to the path of travel of the blank to cut into the blank more than one-half the distance of the width of the blank.

According to yet another preferred embodiment of the invention, the cutting thickness of the first and second saw blades, and thus the cutting waste of the splitting process, is more than 10 percent and less than 20 percent of the thickness of the blank.

According to yet another preferred embodiment of the invention, the method includes the step of increasing the width of the cut in the blank immediately downstream from the first and second saw blades to prevent the blank from pinching the rotating blades.

According to yet another preferred embodiment of the invention, the step of increasing the width of the cut in the blank comprises the step of introducing a plate into the area of the cut in the blank, the plate having a thickness sufficient to increase the width of the cut and thereby spread apart the blank on opposite sides of the cut.

According to yet another preferred embodiment of the invention, the step of increasing the width of the cut in the blank comprises the step of introducing first and second opposed plates into the area of the cut in the blank from opposite sides of the blank, each of the first and second plates having a thickness sufficient to increase the width of the cut and thereby spread apart the blank on opposite sides of the cut.

According to yet another preferred embodiment of the invention, the method includes the step of applying pressure to the top surface of the blank before, during and after the saw blades cut the blank.

A preferred hardwood flooring product is also disclosed, and is made according to a method comprising the steps of processing a strip of raw wood into a blank having a predetermined thickness and width, and top and bottom surfaces defining parallel planes relative to each other and splitting the blank along the width of the blank from one side to the other to form two low profile flooring strips having the same width as the blank and a thickness less than one-half the thickness of the blank. The splitting step comprises the steps of providing first and second circular saw blades mounted on spaced-apart vertical axes for rotation in a single plane intermediate and parallel to the planes of the top and bottom surfaces of the blank and positioning the blank on conveying means upstream from the saw blades with the plane of rotation of the saw blades intermediate and parallel to the planes of the top and bottom surfaces of the blank for movement of the blank from an upstream position to a downstream position relative to the saw blades. The blank is moved downstream into the plane of rotation of the saw blades during rotation of the saw blades thereby horizontally splitting the blank to form first and second low-profile flooring strips. Interlocking means are molded into first and second longitudinally-extending side edges of the flooring strips for securing together flooring strips placed side-to-side to form a floor.

The product according to a preferred embodiment of the invention is made according to a method which includes the step of counterrotating the saw blades in a direction wherein both first and second saw blades cut into the wood in the upstream direction against the downstream direction of travel of the blank.

According to another preferred embodiment of the invention, the step of providing first and second saw blades includes the step of positioning the first saw blade upstream from the second saw blade whereby the first saw blade begins its cut before the second saw blade begins its cut.

According to yet another preferred embodiment of the invention, the first saw blade is positioned upstream from the second saw blade and therefore begins its cut before the second saw blade begins its cut, and wherein both the first and second saw blades are positioned relative to the path of travel of the blank to cut into the blank more than one-half the distance of the width of the blank.

According to yet another preferred embodiment of the invention, the cutting thickness of the first and second saw blades, and thus the cutting waste of the splitting process, is less than 20 percent of the thickness of the blank.

According to yet another preferred embodiment of the invention, the method includes the step of increasing the width of the cut in the blank immediately downstream from the first and second saw blades to prevent the blank from pinching the rotating blades.

According to yet another preferred embodiment of the invention, the step of increasing the width of the cut in the blank comprises the step of introducing a plate into the area of the cut in the blank, the plate having a thickness sufficient to increase the width of the cut and thereby spread apart the blank on opposite sides of the cut.

According to yet another preferred embodiment of the invention, the step of increasing the width of the cut in the blank comprises the step of introducing first and second opposed plates into the area of the cut in the blank from opposite sides of the blank, each of the first and second plates having a thickness sufficient to increase the width of the cut and thereby spread apart the blank on opposite sides of the cut.

According to yet another preferred embodiment of the invention, the method includes the step of applying pressure to the top surface of the blank before, during and after the saw blades cut the blank.

According to yet another embodiment of the invention, a decorative and protective finish is applied to one surface of the flooring strip defined as an exposed surface when installed. Preferably, the flooring strip is installed with the surface which is split in accordance with the method of the invention face down.

BRIEF DESCRIPTION OF THE DRAWINGS

Some of the objects of the invention have been set forth above. Other objects and advantages of the invention will appear as the invention proceeds when taken in conjunction with the following drawings, in which:

FIG. 1 is a schematic flow diagram of steps 1–6 of a wood flooring manufacturing process according to the present invention;

FIG. 2 is a schematic flow diagram of the molding steps 7A–7F of a wood flooring manufacturing process according to the present invention;

FIG. 7 is a perspective view of a completed low profile flooring strip according to an embodiment of the invention, showing the finished, top surface;

FIG. 8 is a perspective view of the opposite side of the low profile flooring strip illustrated in FIG. 7, showing the bottom surface having the nailing recesses formed therein.

DESCRIPTION OF THE PREFERRED EMBODIMENT AND BEST MODE

Figure 3:
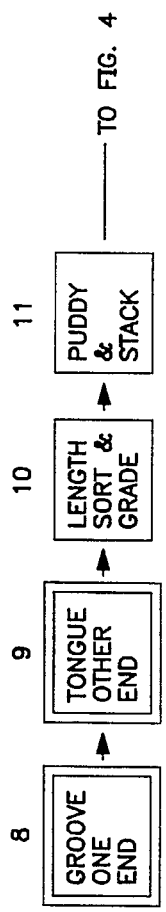
FIG. 3 is a schematic flow diagram of post-molding steps 8–11 of a wood flooring manufacturing process according to the present invention.
Figure 4:
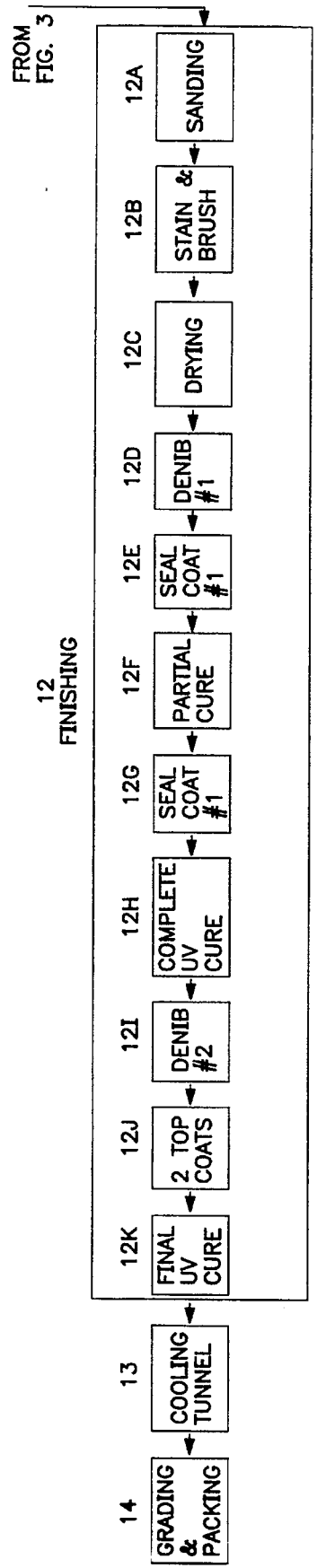
FIG. 4 is a schematic flow diagram of the finishing steps 12A–12K and the post-finishing steps 13–14 of a wood flooring manufacturing process according to the present invention.
Figure 5:
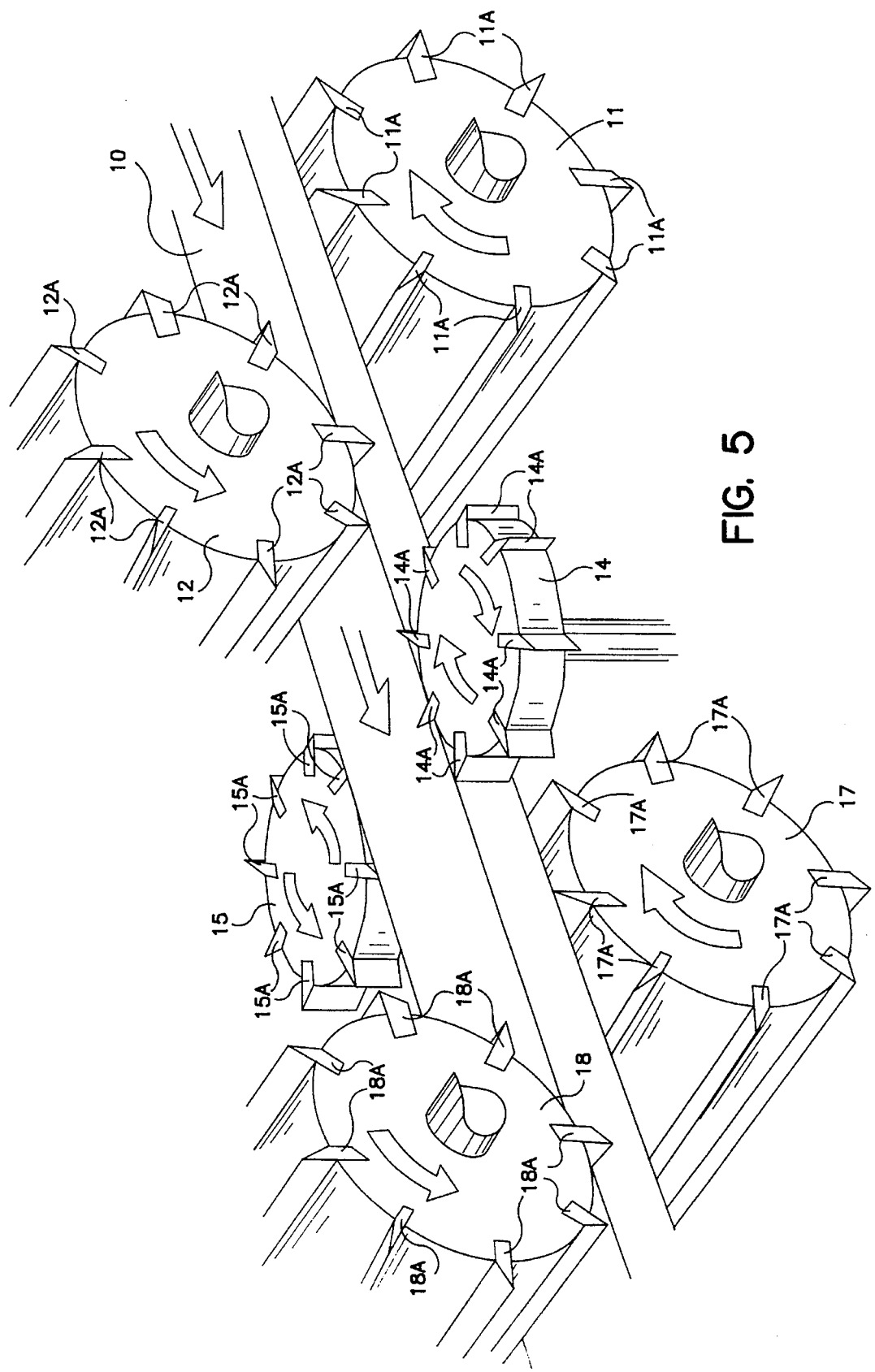
FIGS. 5 and 6 are simplified perspective, schematic views of the splitter showing the passage of a wood flooring blank through the splitter.
Figure 6:
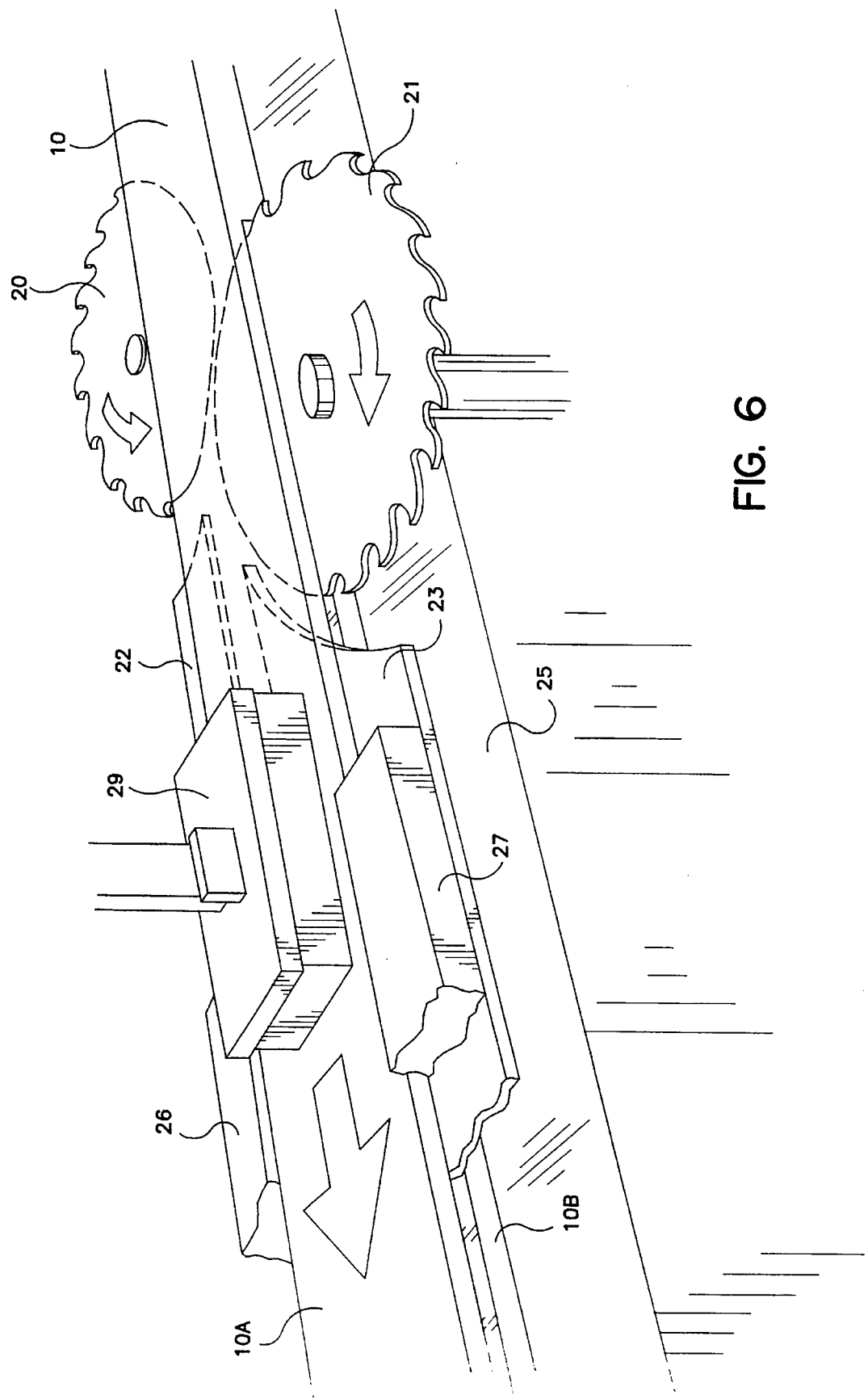
Figure 9:
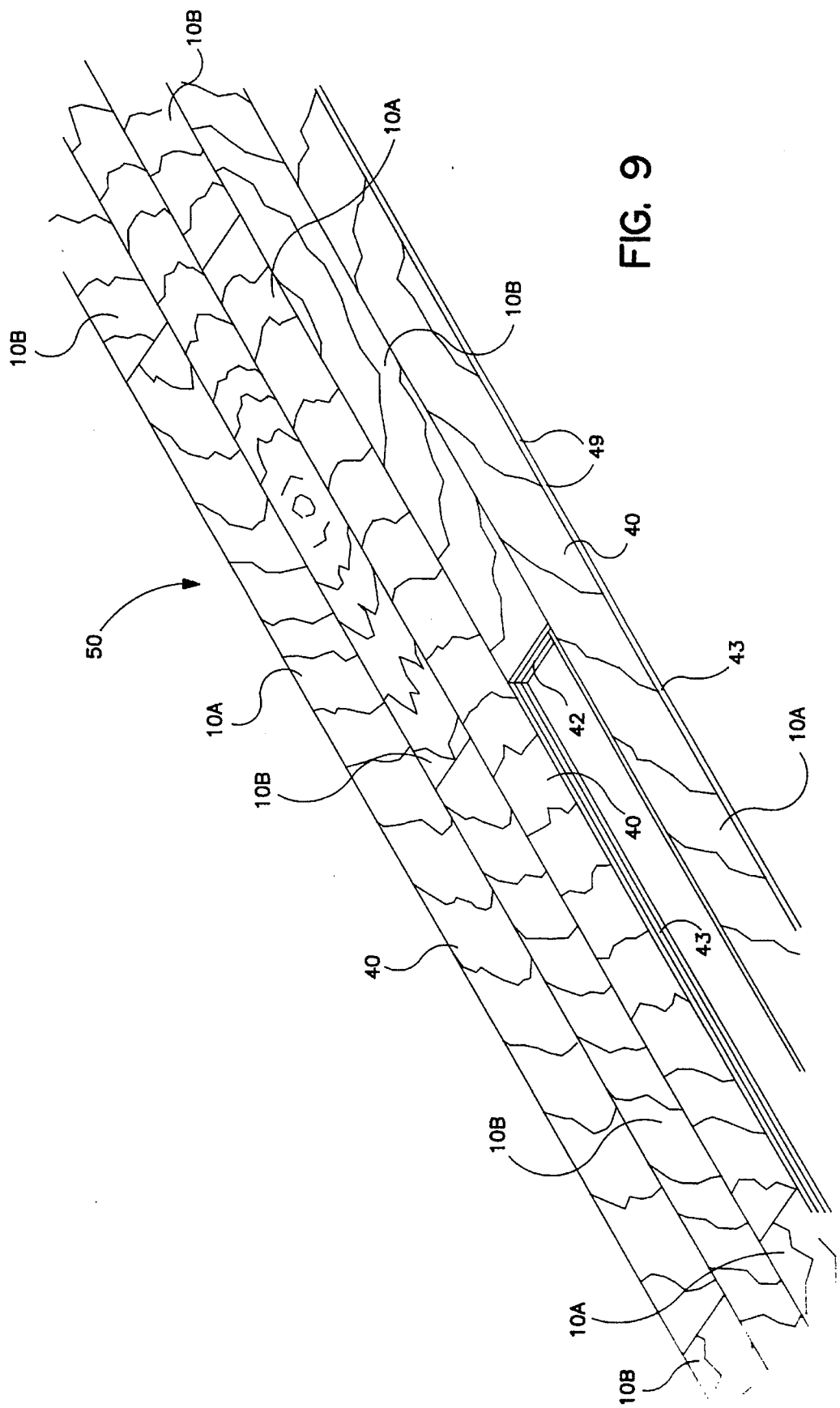
FIG. 9 is a perspective view of a floor assembled from the flooring strips of FIGS. 7 and 8.

Referring now specifically to the drawings, a wood flooring strip manufacturing process which includes a method of splitting a blank into a low profile wooden flooring strip according to the present invention is illustrated in FIGS. 1–6. FIGS. 1–4 set out the process steps in flow-diagram form, while FIGS. 5 and 6 illustrate in broad form the apparatus which splits the wood blanks into low profile flooring strips. FIGS. 7, 8 and 9 illustrate a completed flooring strip and assembled floor. The following description of the preferred embodiment and best mode for practicing the method of the invention uses numbered steps for identification which correlate to the sequentially-numbered boxes of FIGS. 1–4.

DETAILED DESCRIPTION OF MANUFACTURING PROCESS

Step 1. Raw oak is delivered to the plant yard for grading, air drying and storage until use. The oak is delivered in lengths of between 4 and 16 feet. Thickness of the raw oak boards is between 15/16" and 1 3/8", with the average being 1 1/8". Width is a minimum of 3". The raw lumber is stacked to promote even ventilation and drying in order to reduce warping, cracking and checking.

Step 2. The wood is dried both by natural ventilation and in drying kilns, using waste wood from the manufacturing process as the fuel for the kilns. Moisture in the wood is reduced down to 6%–8%.

Step 3. The dried boards are delivered from the kilns to the plant, where they are ripped to width. If the end product is to have a nominal width of 2 1/4" the boards are ripped to 2.531". If the end product is to have a nominal width of 3 1/4" the boards are ripped to 3.531". Tolerances in actual as opposed to nominal dimensions is 0.002".

Step 4. The boards are delivered by conveyor to a knot sawing table where they are inspected for long splits, gouges, knots or other defects. Sections of boards having these defects are removed.

Step 5. The boards which pass inspection form a "blank" from which the flooring strips will be formed. These blanks are delivered to the splitter, which performs the following sequential functions automatically and without intermediate handling.

Step 5A. The blanks are planed bottom and top, removing 0.090" from bottom and 0.008" to 0.446" from top to a thickness at this point of 0.839". See FIG. 5.

Step 5B. The sides of the blanks are planed, reducing the width to 2.495" or 3.495" depending on the final width of the strip. See FIG. 5.

Step 5C. The blanks are planed bottom and top a second time, 0.020" is removed from bottom and 0.35" is removed from top to a thickness at this point of 0.785". See FIG. 5.

Step 5D. The blanks are then "split" by circular saw blades along a horizontal plane into two identical strips, each 2.495" or 3.495" wide, and 0.332" thick. See FIG. 6. The difference between 0.664" (2×0.332") and 0.789" is 0.125"—the thickness of the saw cut and hence the amount of material removed from the thickness of the blank by the blades during splitting. The blades are mounted on vertical axes which are spaced-apart along the direction of travel of the strip through the splitter. The blades counter-rotate into the blank. The blades are spaced only a very small distance apart, so that the cuts actually take place almost simultaneously. The adjustment of the saw blades is sufficiently precise that the cut surfaces of the blank are flush to within a ±0.004" tolerance.

There are several important factors which permit this result to be achieved. First, the use of two blades running at high speed achieves a minimum amount of overhang of the blades outside the stiffening collars. This enhances accuracy with the use of a thinner blade that would normally require the rigidity of a thicker blade. The fact that there is little overhang also increases blade stability by reducing vibration and heating, thereby creating a smoother, more precise cut which can be more closely registered with the cut of the other blade.

Second, use of a single blade to make the entire cut from one side would require three times the horsepower and would place considerably more stress on the blade. In any event, as precise a cut could not be achieved with a single blade cut, since a blade thin enough to avoid excess cutting waste would inherently flex and vibrate enough to create a rougher, less even cut. The cut side of the strip becomes the bottom of the strip when finished. This results from the fact that the moisture in the center of the wood strip is somewhat higher than adjacent the outer surfaces. Thus, the center, where the cut is made, becomes the bottom to eliminate cupping in the finished flooring strips.

Adjustment of the cut is made by adjustment of the blades, rather than by adjustment of feed rolls.

As the cut takes place, the blanks are pushed across the top and bottom, respectively, of a receiver plate which is very slightly thicker that the blade. The receiver plate supports the top strip and prevents its weight from causing it to sag, and keeps the bottom strip firmly positioned on the bed of the splitter. Therefore, pinching of the cutting blades is prevented, and a smoother, more uniform cut is achieved. Processing speed is between 250 and 300 ft/min.

At this point the strips are properly sized, but have no tongue and grooves on the sides or ends, and have not yet been hollow-backed.

Step 6. When the strips leave the splitter they are passed to a finish knot saw station where knots and other defects through the thinner pieces exposed by splitting are removed.

Step 7. The molding process involves a number of steps which put the strips into a condition suitable for finishing.

Step 7A. The strips are trimmed to their final width of 2.25" or 3.25". The tongue length is also trimmed to a length of 0.120". This process will straighten a board with a bow up to 0.060".

Step 7B. The strips are processed through an edge shaper where a portion of the groove is routed into one side of the strip, while the top and bottom portions of the opposite side are routed away to reveal a nearly completed mating tongue. The tongue and groove are formed by cutting one-half of the width of the tongue and groove first, and then the other half. There is a relief of 0.003" below the face of the board above the tongue which insures the face of each board will butt together tightly when installed. The tongue extends outwardly from the side edge of the strip 0.120" on the side facing the top surface and 0.140" on the side facing the bottom surface.

Step 7C. The strips move through a second edge shaper where the remainder of the tongue and the groove is formed. The tongue is 0.110" thick for extending into the 0.119" groove. Spacing of the bottom of the tongue to the bottom of the flooring strip is the same as the spacing of the bottom of the groove to the bottom of the flooring strip (0.065") thus insuring that the groove side of the strip is held down by the nailed tongue side of the previously installed strip.

Step 7D. The nailing groove is routed into the back side of the strips. It is positioned so that the splinters rupturing from the nail protruding through the bottom of the flooring will be in the groove and not between the strip flooring and the sub floor.

Step 7E. The bottom of the strips are planed by removing an additional 0.020", reducing the thickness of the strips down to 0.312".

Step 7F. The back side of the strip is printed with manufacturing data and other necessary information.

Step 8. A groove is routed into one end of each strip for being mated with a complementary groove in an adjacent strip during installation.

Step 9. A mating tongue is shaped onto the other end of the strip by removing the top and bottom edges down to the proper depth. The grooves extend into the strip 0.140" at the top of the groove and 0.135" at the bottom of the groove. The groove has a width of 0.119". The distance from the top surface of the strip to the top of the groove is 0.111".

The tongues extend outwardly from the side edge of the strip 0.120" on the side facing the top surface and 0.140" on the side facing the bottom surface. The tongue is 0.107" thick for extending into the 0.125" groove. At this point the profile of ends and sides are completed.

Step 10. The strips are drop-sorted by length, so each grader has a steady flow of strips to be graded. The strips are graded by the type of finish they will receive and are then conveyed to a series of round tables.

Step 11. At the round tables open defects are puttied and all of the unfinished flooring is stacked to go to the finish line.

Step 12. The strips are conveyed to a finishing line, where they are finished and prepared for shipment to the customer, as follows:

Step 12A. The surface of the strips to be finished is sanded, removing 0.017" from the thickness of the strip, reducing its thickness prior to application of finish to 0.295". This is somewhat less than 5/16" (0.3125"), which is a "nominal" thickness. Even so, the product is referred to as a "5/16" product. A small portion of the thickness removed by sanding is added back by the finishing process in the thickness of the sealing and finish coats.

Step 12B. The sanded strips are stained by passing them under a stain-coated roller, and are brushed to even the stain, and force it into the grain.

Step 12C. The strips are passed through a high-mass oven to dry the stain.

Step 12D. The strips are "denibbed" to remove fine wood fibers raised from the surface of the wood by wetting with stain.

Step 12E. A first sealing coat of clear UV-curable polyurethane sealer is rolled onto the stained surface of the strips.

Step 12F. The strips are passed through a UV chamber, where ultraviolet light partially cures the polyurethane sealer.

Step 12G. A second sealing coat of clear UV-curable polyurethane sealer is rolled onto the stained surface of the strips.

Step 12H. The strips are passed through a UV oven, where the polyethylene coats are completely cured.

Step 12I. The strips are denibbed a second time to remove any raised wood fibers.

Step 12J. First top coats of clear UV-curable polyurethane are rolled onto the UV sealed and cured surface of the strips. A second top coat is applied to the first wet top coat.

Step 12K. The strips are passed through a UV chamber, where ultraviolet light cures the first and second top coats of polyurethane.

Step 13. The strips are quite hot, since UV polymerization is an exothermic reaction. The strips are air-cooled by passing them through a cooling tunnel prior to grading and boxing for shipment.

Step 14. The strips are stacked and arranged into a shipping carton, and the carton is strapped shut. Appropriate paperwork is attached to the carton for inventory and shipping purposes. The manufacturing process is complete.

DESCRIPTION OF SPLITTING PROCESS

Referring now to FIGS. 5 and 6, a simplified illustration of the splitting process described in Step 5, above, is illustrated. As is shown in FIG. 5, a blank 10 from the knot sawing step (Step 4) is planed bottom and top by a pair of rotating planing heads 11 and 12. Each of the planing heads 11 and 12 carry a set of radially, outwardly extending planing blades 11A and 12A, respectively. See Step 5A, above.

The sides of the blank 10 are then planed by left and right planing heads 14 and 15. Each of the planing heads 14 and 15 carry a set of radially, outwardly extending planing blades 14A and 15A, respectively. See Step 5B, above. The various conventional pressure and feed rollers which control the movement of the blank 10 have been removed from FIG. 5 for clarity.

The blank 10 is planed bottom and top a second time, this time by planing heads 17 and 18. Each of the planing heads 14 and 15 carry a set of radially, outwardly extending planing blades 17A and 18A, respectively. See Step 5C, above. During the steps described above, the blank 10 is held in position by conventional pressure shoes, beds and fences so that the finish tolerances are very precise, even though the blanks 10 are moving between 250 and 300 feet per minute.

Referring now to FIG. 6, the blank 10 is then "split" by circular splitter blades 20 and 21 along a horizontal plane into two identical strips, each 0.332" thick. The illustration in FIG. 6 is simplified and schematic, and illustrates the general process by which the blanks 10 are split. This process is actually a "sawing" process, but the term "splitting" is used to emphasize the fact the blanks 10 are being "split" into two equal strips. Each of the splitter blades 20 and 21 are 0.120" thick and remove 0.125" of material from the center of the blank 10. The splitter blades 20 and 21 are mounted on vertical axes which are spaced-apart along the direction of travel of the blank 10 through the splitter. The degree of spacing along the direction of travel between the blades 20 and 21 shown in FIG. 6 is substantially exaggerated for clarity. In practice, the amount of downstream offset of the axis of rotatation of one of the blades 20 and 21 relative to the other is approximately ⅛", so that the blades 20 and 21 counter-rotate into the blank 10 such that the cuts actually take place almost simultaneously. The same blades 20 and 21 are used for producing both 2 ¼" and 3 ¼" strips by adjusting the depth of the cut. The downstream offset of the axis of rotatation of one of the blades 20 and 21 relative to the other remains approximately ⅛.

The adjustment of the splitter blades 20 and 21 is sufficiently precise that the cut surfaces of the blank 10 are flush or very nearly flush to within a tolerance of ±0.004. The blank 10 is cut horizontally cut into two equally-sized strips 10A and 10B.

As the cut takes place, the strips 10A and 10B are pushed across the top and bottom, respectively, of receiver plates 22 and 23. The receiver plates 22 and 23 move into the saw cut and support the top strip 10A and prevent its weight and feed roll pressure from causing it to sag, closing up the cut made by the splitter blades 20 and 21, and pinching the blade. As noted above, the receiver plates 22 and 23 are very slightly thicker (0.005") than the splitter blades 20 and 21. Thus, the top strip 10A is lifted 0.005" to provide some clearance for the splitter blades 20 and 21 and therefore further reduce the possibility of the blades 20 and 21 being pinched.

As is shown in FIG. 6, the front of the receiver plates 22 and 23 are forwardly tapered to feed into the saw cut as soon as it is made. Thus, the newly cut strips 10A and 10B are maintained in essentially the same vertical position as the blank 10 entering the splitter, except for a very slight lifting of the top strip 10A, described above. The receiver plates 22 and 23 also keep the bottom strip firmly positioned on the bed 25 of the splitter. Adjustable fences 26 and 27 on the receiver plates 22 and 23 permit precise guidance of the strips 10A and 10B down the bed 25.

A hold-down shoe 29 prevents the top strip 10A from lifting off of the top of the receiver plates 22 and 23.

The splitter blades 20 and 21 have tungsten carbide cutting edges, and rotate at a speed of 5,400 rpm. Separate 50 horsepower motors power the splitter blades 20, 21 with sufficient torque to permit a clean cut at a through-put rate of between 250 and 300 feet per minute. This speed provides significant manufacturing efficiencies and permits production at a level consistent with the other manufacturing processes.

At this point the strips 10A and 10B are properly sized, but have no tongue and grooves on the sides or ends, and have not yet been hollow-backed. These steps are carried out downstream in Step 7, above. Both strips 10A and 10B are identically sized and are indistinguishable from each other after manufacture.

DESCRIPTION OF FINISHED LOW PROFILE FLOORING STRIP

Referring now to FIGS. 7 and 8, a finished flooring strip 10A is shown. In FIG. 7 the top, finished surface 40 is shown. One end of strip 10A has an interlocking groove 41 (See Step 8) and the other end of the strip 10A has an interlocking tongue 42 (See Step 9). An interlocking tongue 43 extends down one side edge of the strip 10A, while an interlocking groove 44 extends down the opposite side edge. As is shown in FIG. 8, the back side surface 46 has three parallel and longitudinally-extending recesses 47, 48 and 49 (referred to as "hollowbacks" in the trade). The recess 49 is a nailing recess, and provides a space within which splinters created by nailing the strip 10A to the subfloor can reside. The recesses 47 and 48 are primarily for the purpose of relieving stress in the flooring strip 10A.

Referring now to FIG. 9, a section of a floor 50 created from numerous low profile strips 10A and 10B is shown. The floor 50 is visually indistinguishable from a full-thickness floor according to the prior art once installed. As shown, the individual strips 10A and 10B interlock together to create a unitary structure. The individual flooring strips 10A and 10B are carefully interlocked, tongues 41 and 43 in grooves 42 and 44, respectively The floor 50 is assembled "tongue side out" with the nails being driven into the strip 10A through the top of the tongue 43 at an approximate 45 degree angle so that the nail exits the back side surface 46 in the nailing recess 49 before penetrating into the subfloor.

We claim:

1. A method of producing a hardwood flooring product, comprising the steps of:

(a) processing a strip of raw wood into a blank having a predetermined thickness and width defined by top and bottom surfaces and opposing side edge surfaces which reside in parallel planes relative to each other;

(b) planing the top and bottom surfaces of the blank;

(c) planing the side edge surfaces of the blank;

(d) splitting the blank along the width of the blank from one side to the other to form two low profile flooring strips having the same width as the blank and a thickness less than one-half the thickness of the blank;

(e) the steps of (b), (c) and (d) comprising sequential automatic steps without intermediate handling.

2. A method according to claim 1, wherein the step of splitting the blank comprises the steps of:

(a) providing first and second circular saw blades mounted on spaced-apart vertical axes for rotation in a single plane intermediate and parallel to the planes of the top and bottom surfaces of the blank;

(b) positioning the blank on conveying means upstream from said saw blades with the plane of rotation of said saw blades intermediate and parallel to the planes of the top and bottom surfaces of the blank for movement of said blank from an upstream position to a downstream position relative to said saw blades; and (c) moving the blank downstream into the plane of rotation of the saw blades during rotation of said saw blades thereby horizontally splitting the blank to form first and second low-profile flooring strips.

3. A method of producing a hardwood flooring strip according to claim 1, and including the step of molding interlocking tongue and grooves into first and second longitudinally-extending side edges of the flooring strips in a downstream step for securing together like flooring strips placed side-to-side to form a floor.

4. A method of producing a hardwood flooring strip according to claim 1, and including the step of planing the top and bottom surfaces of the blank a second time after the side edge surfaces are planed and before the blank is split.

5. A method of producing a hardwood flooring strip according to claim 2, wherein the step of providing first and second saw blades includes the step of positioning said first saw blade upstream from said second saw blade whereby the first saw blade begins its cut before the second saw blade begins its cut.

6. A method of producing a hardwood flooring strip according to claim 2, wherein said first saw blade is positioned upstream from said second saw blade and therefore begins its cut before the second saw blade begins its cut, and wherein both the first and second saw blades are positioned relative to the path of travel of the blank to cut into the blank more than one-half the distance of the width of the blank.

7. A method of producing a hardwood flooring strip according to claim 2, wherein the cutting thickness of the first and second saw blades, and thus the cutting waste of the splitting process, is more than 10 percent and less than 20 percent of the thickness of the blank.

8. A method of producing a hardwood flooring strip according to claim 2, and including the step of applying pressure to the top surface of the blank before, during and after the saw blades cut the blank whereby the low profile strip is precisely split while permitting high-speed processing.

9. A method of producing a hardwood flooring strip according to claim 1, wherein said blank is less than one inch in thickness as the method steps begin, and the finished flooring strip in its finished form has a nominal thickness of $5/16$ inch.

10. A method of producing a hardwood flooring strip according to claims 2, wherein each of the process steps take place at a rate of feed of the blank into the saw blades of the splitter at a rate of not less than 200 feet per minute.

11. A method of producing a hardwood flooring strip according to claim 1, and including the steps of applying stain and a protective coating to the-flooring strip after shaping of the flooring strip is completed.

12. A hardwood flooring product made according to the method of claim 1, 2, 3, 4, 5, 6, 7, 8, 9, 10 or 11.

* * * * *